Patented Sept. 16, 1941

2,256,434

UNITED STATES PATENT OFFICE 2,256,434

SATURATED ETHYLAMINE DERIVATIVE

Wilfrid Klavehn, Schwetzingen, and Anton Wolf, Heidelberg, Germany, assignors to E. Bilhuber Corporation No Drawing. Application February 12, 1938, Serial No. 190,327. In Germany February 15, 1937

3 Claims. (Cl. 260—583)

This invention relates to new and valuable chemical compounds which are saturated derivatives of ethylamine of the general formula $$R_1-CH-CH_3$$
$$|$$
$$NHR_2$$

wherein $R_1$ is an alkyl radical containing four, five, six or seven carbon atoms in a straight or branched chain and $R_2$ is an alkyl radical containing one, three or five carbon atoms or a cycloalkyl radical. These compounds have a favourable anti-spasmodic action.

$R_1$ may, for example, be butyl, isobutyl, amyl, isoamyl, hexyl, or heptyl. $R_2$ may be an alkyl radical, for example methyl, propyl, isopropyl, amyl, isoamyl or a cyclo-alkyl radical for example cyclopentyl, cyclohexyl, methylcyclohexyl etc.

The new compounds are produced by condensing alkyl methyl ketones of the general formula $R_1-CO-CH_3$ with primary amines of the general formula $R_2NH_2$ wherein $R_2$ is an alkyl containing one, three or five carbon atoms, or cycloalkyl radical, and reducing the product.

The condensation and the reduction may take place simultaneously or successively.

In carrying out the process the ketones are condensed with alkylamines, for example methyl-, propyl-, isopropyl-, amyl-, isoamylamines. The condensation can also be carried out with cycloalkylamines, for example cyclopentyl-, cyclohexyl- or methylcyclohexylamine. The condensation product obtained is reduced in known manner, suitably by nascent hydrogen.

Examples 1. 30 gms. of methyl-2-pentanone-4, $$CH_3.CH(CH_3).CH_2.CO.CH_3$$

were subjected to catalytic reduction in the presence of 12 gms. of methylamine and 100 ccs. of 1% colloidal platinum solution. The calculated quantity of hydrogen was employed. The working up takes place according to the usual process.

The methylamino-4-methyl-2-pentane, $C_7H_{17}N$, obtained boils at 122–124° C. under ordinary pressure and is a mobile liquid of strong ammoniacal odour. The hydrochloride crystallises from alcohol-ether in prisms having a melting point of 130–132° C. The yield is 35 to 45% of the theoretical.

By the use of activated aluminium as the reducing agent the same base can be obtained with a yield of 70 to 80% of the theoretical.

2. 45 gms. of heptanone-2, $CH_3.(CH_2)_4.CO.CH_3$, were dissolved in 400 ccs. of 75% alcohol and reduced with 40 gms. of activated aluminium in the presence of 16 gms. of methylamine. The working up was carried out as in Example 1.

The methylamino-2-heptane, $C_8H_{19}N$ obtained, is a colourless oil with a slight characteristic odour and boils under ordinary pressure at 155° C. The yield is 75 to 85% of the theoretical.

3. 42.6 gms. of nonanone-2, $$CH_3.(CH_2)_6.CO.CH_3$$

were dissolved in 300 ccs. of 75% alcohol and mixed with 28 gms. of a 40% methylamine solution and in the course of 6 to 7 hours subjected to reduction with 30 gms. of activated aluminium on the water bath under a reflux condenser. The working up was carried out as in Example 1. The methylamino-2-nonane, $C_{10}H_{23}N$ obtained, boils homogeneously at 196–198° C. under ordinary pressure. The odour is weakly basic. The base dissolved very easily in dilute mineral acids. The yield was 60 to 70% of the theoretical.

4. 38.4 gms. of methyl-2-heptanone-6, $$CH_3.CH(CH_3).(CH_2)_3.CO.CH_3$$

dissolved in 300 ccs. of 75% alcohol were subjected to reduction with 30 gms. of activated aluminum in the presence of 15 gms. of methylamine. The working up was carried out as in Example 1.

The methylamino-6-methyl-2-heptane, $C_9H_{21}N$ obtained, boils at 62–63° C. under 10 mms. pressure. The bitartrate crystallises from alcohol-ether in prisms having a melting point of 84–86° C. The yield is practically quantitative.

5. 38.4 gms. of methyl-2-heptanone-6, $$CH_3.CH(CH_3).(CH_2)_3.CO.CH_3$$

were condensed with 32 gms. of cyclohexylamine at the temperature of the water bath and then dissolved in 750 ccs. of absolute alcohol. In the course of 1 to 2 hours 70 gms. of sodium were introduced while on the water bath. After the reduction was completed the base was separated out with water.

The cyclohexylamino-6-methyl-2-heptane, $$C_{14}H_{29}N$$

obtained boils at 125–127° C. under 8 mms. pressure. The hydrochloride crystallises from water in needles having a melting point of 188° C. The yield was 40 to 50% of the theoretical.

By the employment of activated aluminum as reducing agent the base was obtained with a yield of 70 to 80% of the theoretical.

6. 89 gms. of octanone-2, $CH_3.(CH_2)_5.CO.CH_3$, and 85 gms. of a 40% aqueous solution of methylamine were dissolved in 750 ccs. of 75% alcohol and subjected to reduction with the aid of 70 gms. of activated aluminum. The working up was carried out in known manner.

The methylamino-2-octane, $C_9H_{21}N$ obtained, is a weakly basic smelling liquid of boiling point 70–72° C. under 8 mms. pressure. The yield was 75 to 85% of the theoretical.

What we claim is:

1. An antispasmodic preparation comprising a saturated derivative of ethylamine of the general formula

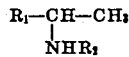

wherein $R_1$ resents an alkyl radical selected from the group consisting of alkyl radicals containing four, five, six and seven carbon atoms and $R_2$ represents a radical selected from the group consisting of alkyl radicals containing one, three and five carbon atoms, and cycloalkyl radicals in a proportion sufficient to impart an effective antispasmodic action to the preparation.

2. An antispasmodic preparation comprising methylamino-4-methyl-2-pentane in a proportion sufficient to impart an effective antispasmodic action to the preparation.

3. An antispasmodic preparation comprising methylamino-2-heptane in a proportion sufficient to impart an effective antispasmodic action to the preparation.

WILFRID KLAVEHN.
ANTON WOLF.